United States Patent
Chen

(10) Patent No.: US 10,065,453 B2
(45) Date of Patent: Sep. 4, 2018

(54) WHEEL SECURING STRUCTURE OF TRUCKS

(71) Applicant: ALEX GLOBAL TECHNOLOGY, INC., Tainan (TW)

(72) Inventor: Wei-Chin Chen, Tainan (TW)

(73) Assignee: Alex Global Technology, Inc., Tainan (TW)

( * ) Notice: Subject to any disclaimer, the term of this patent is extended or adjusted under 35 U.S.C. 154(b) by 97 days.

(21) Appl. No.: 15/045,455

(22) Filed: Feb. 17, 2016

(65) Prior Publication Data

US 2017/0232792 A1 Aug. 17, 2017

(51) Int. Cl.
*B60B 27/06* (2006.01)
*B60B 3/16* (2006.01)

(52) U.S. Cl.
CPC ............. *B60B 27/065* (2013.01); *B60B 3/16* (2013.01); *B60B 3/165* (2013.01); *B60B 27/06* (2013.01); *B60B 2360/104* (2013.01); *B60B 2900/111* (2013.01); *B60B 2900/311* (2013.01); *B60B 2900/711* (2013.01)

(58) Field of Classification Search
CPC .. B60B 3/16; B60B 3/145; B60B 3/02; B60B 23/10; B60B 3/14; B60B 3/165; B60B 27/06; B60B 27/065
USPC .................................................... 301/35.632
See application file for complete search history.

(56) References Cited

U.S. PATENT DOCUMENTS

| | | | | |
|---|---|---|---|---|
| 3,556,570 A * | 1/1971 | Cosenza | ............... | F16B 5/0208 296/187.01 |
| 4,898,429 A * | 2/1990 | Plumer | .................... | B60B 3/16 301/35.632 |
| 5,042,880 A * | 8/1991 | Garuti | ....................... | B60B 3/14 301/35.624 |
| 5,056,870 A * | 10/1991 | Plumer | .................... | B60B 3/16 301/35.632 |
| 5,452,944 A * | 9/1995 | Bear | ....................... | B60B 3/142 301/35.624 |
| 5,597,279 A * | 1/1997 | Thomas | .................. | B60B 3/145 411/432 |
| 5,711,581 A * | 1/1998 | Plumer | .................... | B60B 3/02 301/35.632 |
| 6,068,344 A * | 5/2000 | Nether | .................... | B60B 3/145 301/35.632 |

(Continued)

*Primary Examiner* — S. Joseph Morano
*Assistant Examiner* — Scott A Browne
(74) *Attorney, Agent, or Firm* — Rosenberg, Klein & Lee

(57) ABSTRACT

A wheel securing structure for trucks is provided. The securing structure generally includes iron screwshaft liners installed in keyholes of mounting parts of aluminum wheels. The bolts of an assembling part correspondingly penetrate the holes of respective screwshaft liners. A first folded edge and a second folded edge are formed on two terminals of each screwshaft liner to respectively insert into conical pits formed on the mounting part of a wheel. The nuts screw onto the bolts of the assembling part to secure the wheel onto the assembling part. When the trucks pass bumpy roads, relative motion caused by vibrations occurs between the wheels and the assembling part, and friction is generated between various parts. The screwshaft liner protects the soft aluminum wheel from being directly rubbed by the bolts, nuts, and the assembling part. Accordingly, the aluminum wheel is made suitable for trucks and other heavy vehicles.

1 Claim, 4 Drawing Sheets

(56) References Cited

U.S. PATENT DOCUMENTS

| | | | | |
|---|---|---|---|---|
| 6,416,135 B1* | 7/2002 | Greubel | ................... | B60B 3/02 |
| | | | | 301/35.625 |
| 2008/0309151 A1* | 12/2008 | Kleber | ..................... | B60B 3/16 |
| | | | | 301/37.31 |
| 2014/0175863 A1* | 6/2014 | Dingle | ................... | F16B 43/00 |
| | | | | 301/111.03 |
| 2016/0016427 A1* | 1/2016 | Keller | ................... | B60B 3/145 |
| | | | | 301/35.621 |

* cited by examiner

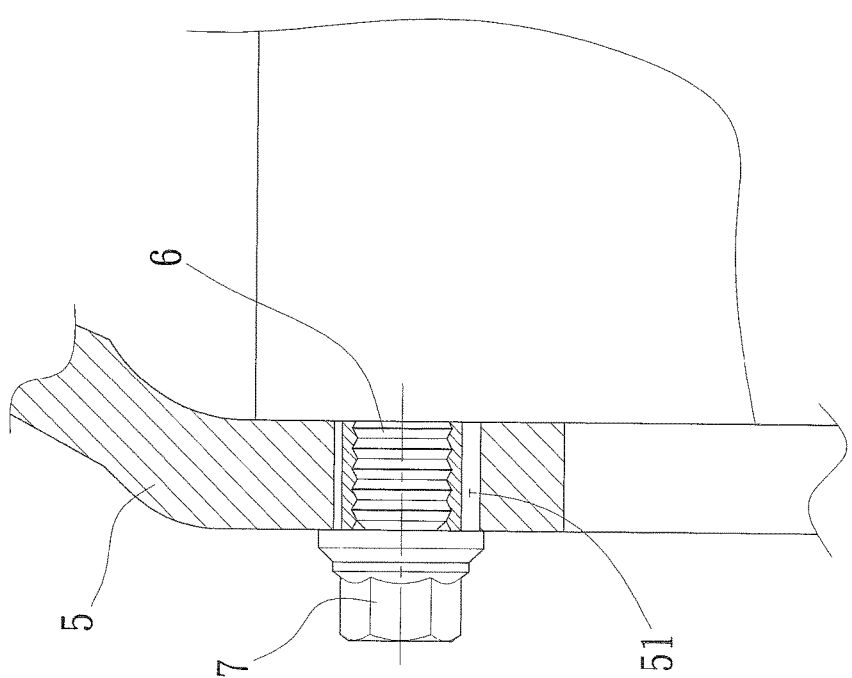

WHEEL SECURING STRUCTURE OF TRUCKS

BACKGROUND

Field of Invention

The disclosure relates to a wheel securing structure of trucks. More particularly, a simple structure design is used to permit aluminum wheels to be used in trucks and other heavy vehicles.

Description of Related Art

At present, wheels and drive shafts of vehicles are assembled through wheels. Nuts and bolts are used to fasten the wheel drive shafts and wheels, and then tires are assembled on the wheels. Accordingly, the drive shaft is rotated to drive the wheels and move the vehicles forward.

Iron wheels are primarily used in traditional vehicles. However, the weight of iron wheels is heavier. Therefore, more energy is consumed when vehicles advance. The heat dissipation of iron wheels is also poorer to cause tires to be blown out easily. Moreover, iron wheels easily rust. Therefore, wheel covers are used to cover iron wheels to increase the aesthetics of the vehicles. In light of the many drawbacks of iron wheels, practitioners researched and developed aluminum wheels. Aluminum wheels are relatively lighter in weight to conserve energy when vehicles advance. The heat dissipation of aluminum wheels is excellent, preventing tires from being blown out. Moreover, the surfaces of aluminum wheels can be polished and electroplated to have a bright and beautiful look. Wheel covers are thus no longer needed. Therefore, aluminum wheels are commonly adopted for vehicles.

However, heavy vehicles, including trucks, combination trucks, and container trucks, still use iron wheels. The main reason is that the wheels of the heavy vehicles are bigger than the wheels of common vehicles. When heavy vehicles pass over bumpy roads, the wheels must withstand greater forces. For increasing driving safety, iron wheels with better rigidity are used.

Therefore, in view of the conventional aluminum wheels having the advantages of light weight, fuel saving, good heat dissipation, and aesthetically pleasing appearance but having drawbacks of not being capable of use by trucks etc., the inventors develop this invention by the many-years of manufacturing and design experience and knowledge in the related fields and ingenuity.

SUMMARY

This invention is related to a truck's securing structure. The main purpose is to provide a simple and convenient structure design for a securing structure of aluminum wheels suitable for use by trucks and other heavy vehicles.

For achieving the purpose above, a truck's securing structure is provided. The securing structure generally comprises an aluminum wheel. The aluminum wheel includes a mounting part, a rim part formed on a periphery of the mounting part, a receiving space formed by the mounting part and the rim part, and plural keyholes disposed on a central periphery of the mounting part; an assembling part having an axial connection part and received by the receiving space of the wheel, as well as plural bolts disposed on a central periphery of the assembling part and penetrating the keyholes of the mounting part of the wheel; and plural nuts secured onto the bolts correspondingly. The truck's securing structure is characterized in the following.

Plural iron screwshaft liners have a cylindrical shape and are sleeve-connected to the keyholes of the mounting part of the wheel respectively to tightly match the screwshaft liners and the keyholes. The bolts penetrate the holes of the screwshaft liners, and a length of the screwshaft liners is longer than a length of the keyholes to let two ends of the screwshaft liners each extend out of the keyholes. Conical pits are formed on two terminal surfaces of the mounting part and positioned to respectively correspond to the keyholes. Two ends of the screwshaft liners each are folded to form a first folded edge and a second folded edge to respectively insert into the conical pits on two terminal surfaces. The wheel, the assembling parts and the nuts are secured.

Accordingly, when the securing structure is assembled to be used, the central axial connection part is secured to a wheel drive shaft of heavy vehicles including trucks. Therefore, the wheel can be driven by the wheel drive shaft through the assembling part to propel the truck to move forward. When the trucks pass bumpy roads, relative motion, caused by vibrations, occurs between the wheels and the assembling part. Therefore, friction is generated between the wheels and the bolts, as well as between the nuts and terminal surfaces of the assembling part. The screwshaft liners are used to let the friction above act on the screwshaft liners. Therefore, the soft aluminum wheel will not be directly rubbed by the bolts, nuts, and the assembling part to thus avoid damage. Accordingly, the aluminum wheel can be suited for trucks and other heavy vehicles.

BRIEF DESCRIPTION OF THE DRAWINGS

FIG. 4 is a partially enlarged cross-sectional view of a conventional wheel securing structure.

DETAILED DESCRIPTION

Figure 1:
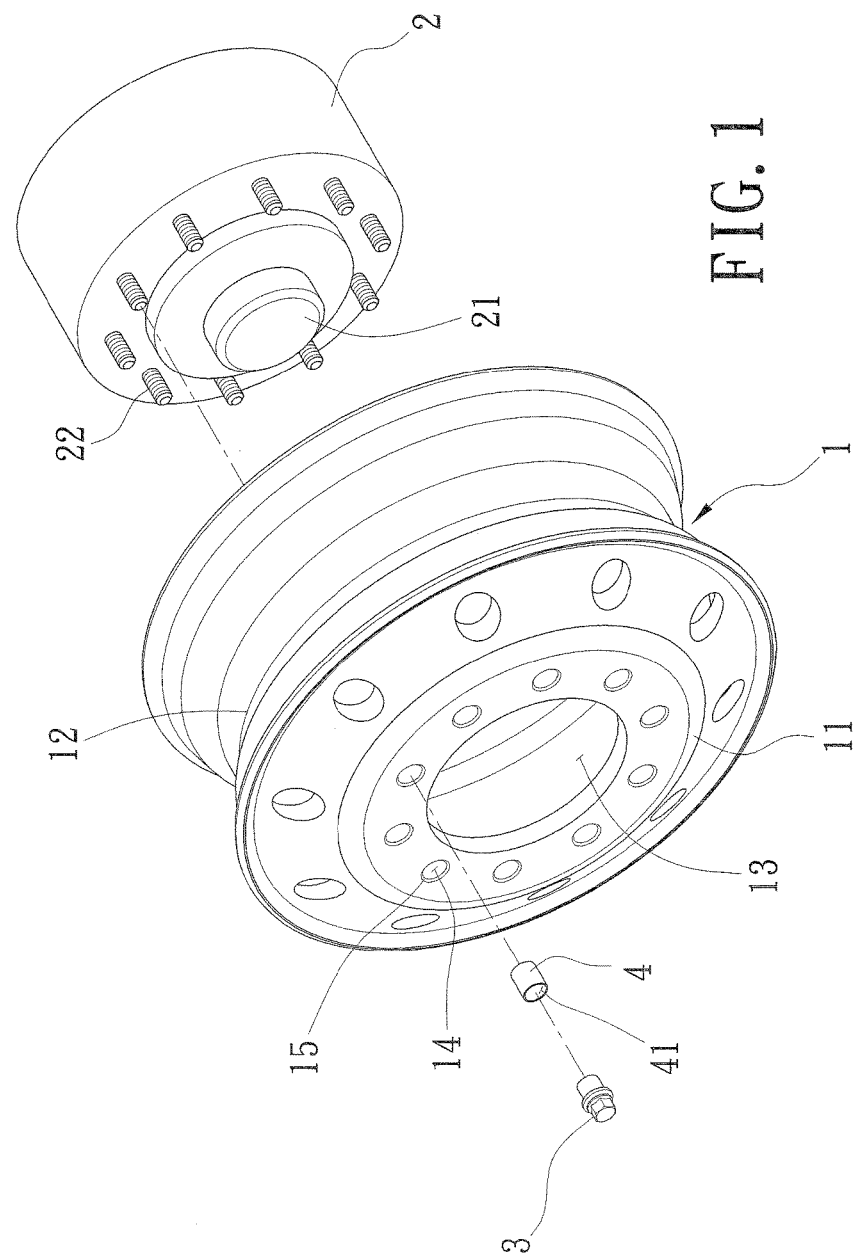
FIG. 1 is an exploded perspective view of this invention.

The inventors have tested aluminum wheels on trucks when the trucks move. As shown in FIG. 4, the damaged parts of the aluminum wheel 5 were mainly focused on the keyholes 51 penetrated by bolts 6, as well as the terminal surfaces compressed by nuts 7. The main reason is that when the steel bolts 6 and nuts 7 contact and rub against the aluminum wheel 5, the keyholes 51 and the terminal surface of the soft aluminum wheel 5 are easily expanded and deformed. Other parts of the aluminum wheel 5 were not damaged. Therefore, the structure of the aluminum wheels 5 contacted by the nuts and bolts may be strengthened to be used by trucks and other heavy vehicles.

To more completely and clearly illustrate the technical means and effects of this invention, the detailed descriptions are set forth below. Please refer to the disclosed figures and reference numbers.

First, referring to FIG. 1, the figure shows the truck's securing structure in an embodiment of this invention generally having a wheel 1. The wheel 1 has a mounting part 11 and a rim part 12 formed on a periphery of the mounting part 11. A receiving space 13 is formed by the mounting part 11 and the rim part 12. Plural keyholes 14 are disposed on a central periphery of the mounting part 11. An assembling part 2 has an axial connection part 21 to be secured and connected to a wheel drive shaft. The assembling part 2 is disposed in a receiving space 13 of the wheel 1. Plural bolts 22 are disposed on a central periphery of the assembling part 2 penetrating the keyholes 14 of the mounting part 11 of the wheel 1. Plural nuts 3 respectively secure to the bolts 22 correspondingly. The truck's securing structure is characterized in the followings.

Plural iron screwshaft liners 4 have a cylindrical shape and are sleeve-connected to the keyholes 14 of the mounting part 11 of the wheel 1 respectively to tightly match the screwshaft liners 4 and the keyholes 14. The bolts 22 penetrate the holes 41 of the screwshaft liners 4, a length of the screwshaft liners 4 being longer than a length of the keyholes 14 to let two ends of the screwshaft liners 4 each extend out of the keyholes 14. Conical pits 15 are formed on two terminal surfaces of the mounting part 11 respectively about corresponding the keyholes 14. Two ends of the screwshaft liners 4 are folded to form a first folded edge 42 and a second folded edge 43 to respectively insert into the conical pits 26 on the two terminal surfaces of the mounting part 11. The wheel 1, the assembling part 2, and the nuts 3 are thereby secured and positioned.

The nuts 3 bear against the first folded edge 42 to be positioned. A terminal surface of the assembling part 2 bears against the second folded edge 43 to be positioned.

Figure 2:
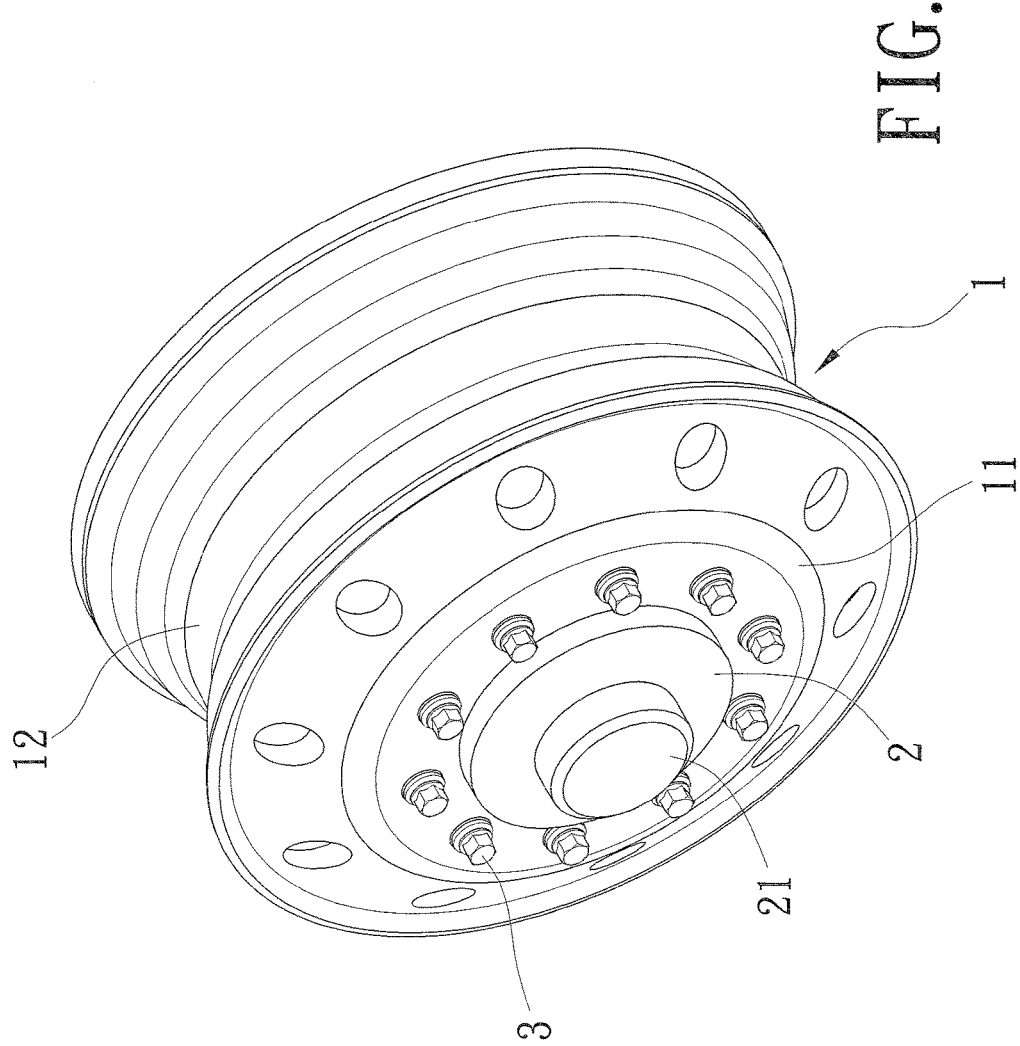
FIG. 2 is a perspective assembling view of this invention.
Figure 3:
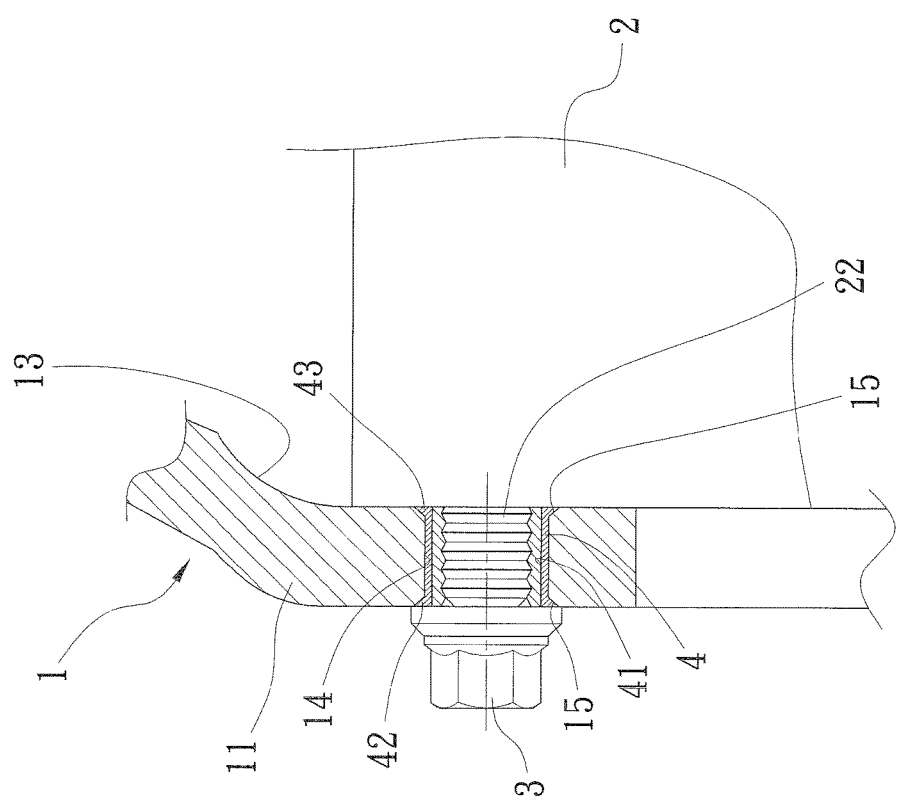
FIG. 3 is a partially enlarged cross-sectional view of this invention.

Referring to FIGS. 2 and 3, when the securing structure is assembled, the axial connection part 21 of the assembling part 2 is securely connected to the wheel drive shaft of a truck or other heavy vehicle and assembled with the rim part 12 of an aluminum wheel 1 pre-installed with a tire. Before assembling the wheel 1 and the assembling part 2, several screwshaft liners 4 are sleeved in the keyholes 14 of the mounting part 11 of the wheel 1 one by one to form a tightly matched assembly with the keyholes 14. Subsequently, the first folded edge 42 and the second folded edge 43 are formed by using a fixture punching the two extending terminals projecting from the keyholes 14. The first folded edge 42 and the second folded edge 43 are correspondingly inserted into the conical pits 15 on the two terminal surfaces of the mounting part 11. The wheel 1 assembled with the screwshaft liners 4 is further assembled with the assembling part 2. The plural bolts 22 of the assembling part 2 correspondingly penetrate the holes 41 of the screwshaft liner 4, and the assembling part 2 is positioned in the receiving part 13 of the wheel 1. One terminal surface of the assembling part 2 bears against one terminal surface of the mounting part 11 and thereby positioned. Plural nuts 3 insert into the holes 41 of the screwshaft liners 4 to screw onto the bolts 22 one by one. The nuts 3 engage another terminal surface of the mounting part 11 and are positioned to secure the wheel 1 and the assembling part 2.

A truck's wheel drive shafts are rotated to drive the wheels 1 with the tires through the assembling parts 2 to cause the truck to move forward. When the trucks pass bumpy roads, relative motion caused by vibrations occurs between the assembling joints of the assembling parts 2, bolts 22, and nuts 3. Therefore, friction is generated between the wheels 1 and the assembling parts 2, as well as between the nuts 3 and the bolts 22. At this time, the screwshaft liners 4 serve to let the friction between a wheel 1 and a terminal surface of an assembling part 2 mainly act on the second folded edges 43 of the screwshaft liners 4, the friction at the contact rubbing sites of the nuts 3 to mainly act on the first folded edge 42, and the friction at the contact rubbing sites of the bolts 22 to mainly act on the screwshaft liner 4 surfaces about the holes 41. Accordingly, the soft aluminum wheel will not be directly rubbed by the bolts 22, nuts 3, or the assembling part 2 and thus avoid damage. Accordingly, the aluminum wheel 1 can be made suitable for trucks and other heavy vehicles.

From the structure and embodiments hereof, it can be seen that this invention has the following advantages.

1. The securing structure of the truck's wheels use screwshaft liners to strengthen the structural strength of the contact sites between the aluminum wheels and bolts, as well as between the aluminum wheels and the nuts and the assembling parts. Therefore, aluminum wheels having the advantages of light weight, fuel saving, good heat dissipation, and aesthetics may also be used in trucks and other heavy vehicles.

2. A truck's wheel securing structure uses a simple and convenient screwshaft liner to solve the problem of aluminum wheels being incapable of use in trucks and other heavy vehicles. In particular, the convenient structure facilitates assembling and operating without adding too much cost. Thus, the securing structure may be mass produced.

What is claimed is:

1. A truck's securing structure, comprising:
    an aluminum wheel, wherein the wheel includes a mounting part, a rim part formed on a periphery of the mounting part, a receiving space formed by the mounting part and the rim part, and a plurality of keyholes disposed on a central periphery of the mounting part;
    an assembling part having an axial connection part and received by the receiving space of the wheel, a plurality of bolts disposed on a central periphery of the assembling part respectively penetrating the keyholes of the mounting part of the wheel;
    a plurality of nuts screw coupled to corresponding ones of the bolts; and,
    a protective securing structure including:
        a plurality of iron screwshaft liners each having a cylindrical shape and each coaxially engaging one of the keyholes of the mounting part of the wheel, the bolts penetrating the holes of the screwshaft liners, the screwshaft liners each being configured in length to have two axial ends extending out of the keyholes when coaxially engaged therewith; and
        first and second conical pits formed on two terminal surfaces of the mounting part at opposed axial openings of each of the keyholes coaxially engaged by one of the screwshaft liners, the two axial ends of each screwshaft liner coaxially engaging a keyhole being deflected to form first and second folded edges received respectively in the conical pits on the two terminal surfaces, the first and second folded edges formed for each screwshaft liner being substantially symmetric about a plane radially bisecting the screwshaft liner;
    wherein each of the screwshaft liners extends coaxially through a keyhole of the mounting part between substantially symmetric first and second axial ends thereof, the wheel, the assembling part and the nuts are secured and positioned.

* * * * *